US008920655B2

(12) United States Patent
Dong et al.

(10) Patent No.: US 8,920,655 B2
(45) Date of Patent: Dec. 30, 2014

(54) METHOD FOR ORGANICS REMOVAL FROM MINERAL PROCESSING WATER USING A ZEOLITE

(75) Inventors: Jie Dong, Mississauga (CA); Manqiu Xu, Mississauga (CA); Kenneth Erwin Scholey, Oakville (CA)

(73) Assignee: Vale S.A., Rio de Janeiro (BR)

( * ) Notice: Subject to any disclaimer, the term of this patent is extended or adjusted under 35 U.S.C. 154(b) by 610 days.

(21) Appl. No.: 13/231,730

(22) Filed: Sep. 13, 2011

(65) Prior Publication Data
US 2012/0175311 A1 Jul. 12, 2012

Related U.S. Application Data

(60) Provisional application No. 61/382,101, filed on Sep. 13, 2010.

(51) Int. Cl.
| | | |
|---|---|---|
| *C02F 3/00* | (2006.01) | |
| *C02F 1/28* | (2006.01) | |
| *C02F 1/68* | (2006.01) | |
| *C22B 3/24* | (2006.01) | |
| *C02F 1/42* | (2006.01) | |
| *C02F 101/20* | (2006.01) | |
| *C02F 101/30* | (2006.01) | |
| *C02F 101/38* | (2006.01) | |
| *C02F 103/10* | (2006.01) | |
| *C02F 1/62* | (2006.01) | |
| *C02F 11/00* | (2006.01) | |
| *C02F 101/22* | (2006.01) | |
| *C02F 103/16* | (2006.01) | |

(52) U.S. Cl.
CPC .............. *C02F 1/281* (2013.01); *C02F 1/683* (2013.01); *C22B 3/24* (2013.01); *C02F 1/42* (2013.01); *C02F 2101/20* (2013.01); *C02F 2101/303* (2013.01); *C02F 2101/38* (2013.01); *C02F 2103/10* (2013.01); *C02F 1/62* (2013.01); *C02F 11/004* (2013.01); *C02F 2001/425* (2013.01); *C02F 2101/22* (2013.01); *C02F 2103/16* (2013.01); *C02F 2209/06* (2013.01); *C02F 2301/024* (2013.01); *C02F 2303/16* (2013.01); *C02F 2303/18* (2013.01)
USPC ........................................... 210/688; 210/691

(58) Field of Classification Search
USPC ................................................. 210/691, 688
See application file for complete search history.

(56) References Cited

U.S. PATENT DOCUMENTS

| | | |
|---|---|---|
| 4,167,481 A | 9/1979 | Cremers et al. |
| 4,659,512 A | 4/1987 | Macedo et al. |
| 5,443,736 A | 8/1995 | Szmanda et al. |
| 5,499,829 A | 3/1996 | Rohm et al. |
| 6,326,326 B1 | 12/2001 | Feng et al. |
| 2009/0023604 A1 | 1/2009 | Pears et al. |

*Primary Examiner* — Chester Barry
(74) *Attorney, Agent, or Firm* — Arent Fox LLP

(57) ABSTRACT

The present invention relates to a method of removing organic chemicals and organometallic complexes (organic heavy metal complexes) using zeolites from process water or tailings streams of a mineral processing plant where diethylenetriamine (DETA) or triethylenetetramine (TETA) is used as a flotation reagent and DETA-metal complexes are found in process water or tailings streams. The process water or slurry tailings streams of a mineral processing plant containing DETA, DETA-metal complexes and residual heavy metals may be contacted with natural zeolites. This may be carried out by adding the natural zeolites to the process streams or slurries while mixing with a mechanical mixer to efficiently adsorb DETA, DETA-metal complexes and heavy metals from the process streams on the zeolite. The loaded zeolite may then be discarded with the flotation tailings.

16 Claims, 7 Drawing Sheets

METHOD FOR ORGANICS REMOVAL FROM MINERAL PROCESSING WATER USING A ZEOLITE

This application claims priority from U.S. Patent Application No. 61/382,101, titled "Method for the Removal of Heavy Metals from the Wastewater of a Mineral Processing Plant Containing Diethylenetriamine (Deta) and Deta-Metal Complexes using Natural Zeolite," filed on Sep. 13, 2010, and which is incorporated herein by reference in its entirety.

BACKGROUND OF THE INVENTION

1. Field of Invention

Aspects of the present invention relate to a method of removing organic chemicals and organometallic complexes from wastewater. More particularly, aspects of the present invention relate to a method of removing organic chemicals and organometallic complexes (organic heavy metal complexes) using zeolite from process water or tailings streams of a mineral processing plant where diethylenetriamine (DETA) or triethylenetetramine (TETA) is used as a flotation reagent and DETA-metal complexes are found in process water or tailings streams.

2. Description of Related Art

DETA (Diethylenetriamine) has conventionally been used to assist with the selective separation of minerals, such as pentlandite, from the waste mineral pyrrhotite. It is generally important to achieve a target concentrate reagent grade at the desired recovery when processing complex sulphide ores. DETA is a strong chelating agent and it can form very stable complexes with heavy metal ions ($Cu^{2+}$ and $Ni^{2+}$) in solution.

Conventional wastewater treatment methods, which generally involve raising the pH above 9.5 with lime to form metal hydroxide precipitates, is not effective when DETA-Cu/Ni complexes are present, even at pH 12. In order to be able to use DETA dosages to reach a desirable level of pyrrhotite rejection in the mineral processing step without generating excessive amounts of heavy metals in the effluent, an effective method is required to remove DETA and its complexes from the process water or contain it in the tailings area.

Natural zeolites are microporous crystalline aluminosilicates with well-defined structures in that silicon and aluminium atoms are tetrahedrally coordinated with each other through shared oxygen atoms to form a regular framework. With their unique porous properties, wide availability, low cost and high efficiency, natural zeolites are used in a variety of applications with a global market of several million tonnes per year. The major uses of natural zeolites are in petrochemical cracking as catalysts, in the separation and removal of gases and solvents, and ion-exchange applications in water softening, purification, heavy metal removal and nuclear effluent treatment because exchangeable ions in zeolite (sodium, calcium and potassium ions) are relatively innocuous. Other applications for zeolites, such as filtration, odor control, and desiccation, are also found in aquaculture, agriculture and animal husbandry. For example, clinoptilolite zeolite (a typical natural zeolite) has been studied extensively as an ion exchanger and is commercially used in the treatment of industrial and municipal wastewaters to reduce the concentration of ammonia.

However, most of the studies about ion exchange with zeolite have focused on the removal of free metal/ammonium ions from the wastewater of electroplating shops, in some cases through the addition of polyamines such as DETA to the wastewater. For example, U.S. Pat. No. 4,167,481 discloses a process for removal of metals from metal-containing solutions comprising adding to the solution a polyamine and contacting the solution with a cation exchanger selected from tectosilicates or phyllosilicates; and U.S. Pat. No. 5,500,126 discloses a process for removal of metal ions from metal plating waste streams comprising adding to the solution a polyamine in an amount of 0.1 to 0.5 times the metal concentration and contacting the aqueous solution with a cation exchanger.

It should be noted that the state of the art is silent regarding the use of zeolite in the removal of organic chemicals, such as DETA, and chelated metal organic molecules, such as DETA-Cu/Ni complexes from the process water or slurry tailings streams of mineral processing plants. In this case, DETA and DETA-metal complexes are present in the process water and slurry tailings streams due to the DETA additions made as part of the mineral processing steps and have to be removed or controlled. The process water and slurry tailings streams generally contain residual amounts of flotation chemicals and have relatively high levels of Ca and Mg ions, which may affect the adsorption of heavy metals on zeolite.

SUMMARY OF THE INVENTION

In light of the above described problems and unmet needs, aspects of the present invention aim at the removal of DETA and DETA-metal complexes from the process water or slurry tailings stream of a mineral processing plant using zeolite.

Various aspects of the present invention provide a method for removing organic chemicals and organometallic complexes from the process water or slurry tailings streams of a mineral processing plant, the process water or slurry tailings streams containing DETA (Diethylenetriamine) and DETA-heavy metal complexes. According to various aspects, the method may include (a) contacting the process water or slurry tailings streams containing the DETA and DETA-heavy metal complexes with zeolites to adsorb the DETA, DETA-heavy metal complexes and any residual free heavy metal ions, and (b) discarding the loaded zeolite with the tailings from the mineral processing plant. According to various aspects, the contact between the process water or slurry tailings stream and the zeolite in step (a) may be enhanced by using mechanical stirring or by the turbulence generated during pumping and transporting, and can be done in situ at the mineral processing plant, or in a dedicated ion exchange column or counter-current batch reactor. According to various aspects, the zeolite may be a natural zeolite selected from the group of linoptilolite, chabazite, mordenite, erionite, and phillipsite.

According to various aspects, the heavy metals in organometallic complexes may be or include Cu and Ni. However, the heavy metals in organometallic complexes may also be or include other metal ions such as Cd, Co, Cr, Zn, Pb, Hg, Ag, Cs, Rb, Ba, Sr.

According to various aspects, the organic chemicals may include other organic chemicals from the amine group, such as TETA (triethylenetetramine) and other polyamines which carry positive charges after dissociation in the solution at different pH values and are highly exchangeable into zeolite. The pH of the streams to be treated may cover a range from about 2 to 12, covering typical conditions in a mineral processing plant as well as a tailings area.

According to other aspects of the present invention, the zeolite is pretreated with DETA in an ion-exchange process to enhance adsorption of the heavy metals on the zeolite. Alternatively, DETA may also be added to the process water or slurry tailings streams to complex substantially all of the heavy metals to enhance adsorption on the zeolite.

Various aspects of the present invention provide a method for removing organic chemicals and organometallic complexes from the process water or slurry tailings streams of a mineral processing plant, the process water or slurry tailings streams containing DETA and DETA-heavy metal complexes. According to various aspects, the method may include pretreating zeolite with DETA in an ion-exchange process to enhance adsorption of the heavy metals on the zeolite, contacting the process water or slurry tailings streams containing the DETA and DETA-heavy metal complexes with the zeolite to adsorb the DETA, DETA-heavy metal complexes and any residual free heavy metal ions, and discarding the loaded zeolite with the tailings from the mineral processing plant.

Various aspects of the present invention provide a method for removing organic chemicals and organometallic complexes from the process water or slurry tailings streams of a mineral processing plant, the process water or slurry tailings streams containing DETA (Diethylenetriamine) and DETA-heavy metal complexes. According to various aspects, the method including adding DETA to the process water or slurry tailings streams to complex substantially all of the heavy metals, contacting the process water or slurry tailings streams containing the DETA and DETA-heavy metal complexes with zeolites to adsorb the DETA, DETA-heavy metal complexes and any residual free heavy metal ions, and discarding the loaded zeolites with the tailings from the mineral processing plant.

Various aspects of the present invention provide a method for controlling the DETA levels in the slurry tailings area of a minerals processing plant. The method may include the addition of up to about 5% zeolite to the slurry tailings stream to manage the continued release of DETA through the slurry tailings stream and the addition of up to about 5% zeolite to the slurry tailings area to manage the continued desorption of DETA from the tailings solids.

Additional advantages and novel features of these aspects of the invention will be set forth in part in the description that follows, and in part will become more apparent to those skilled in the art upon examination of the following or upon learning by practice of the invention.

BRIEF DESCRIPTION OF THE DRAWINGS

Various exemplary aspects of the systems and methods will be described in detail, with reference to the following figures, wherein.

DETAILED DESCRIPTION OF PREFERRED ASPECTS

Figure 1:
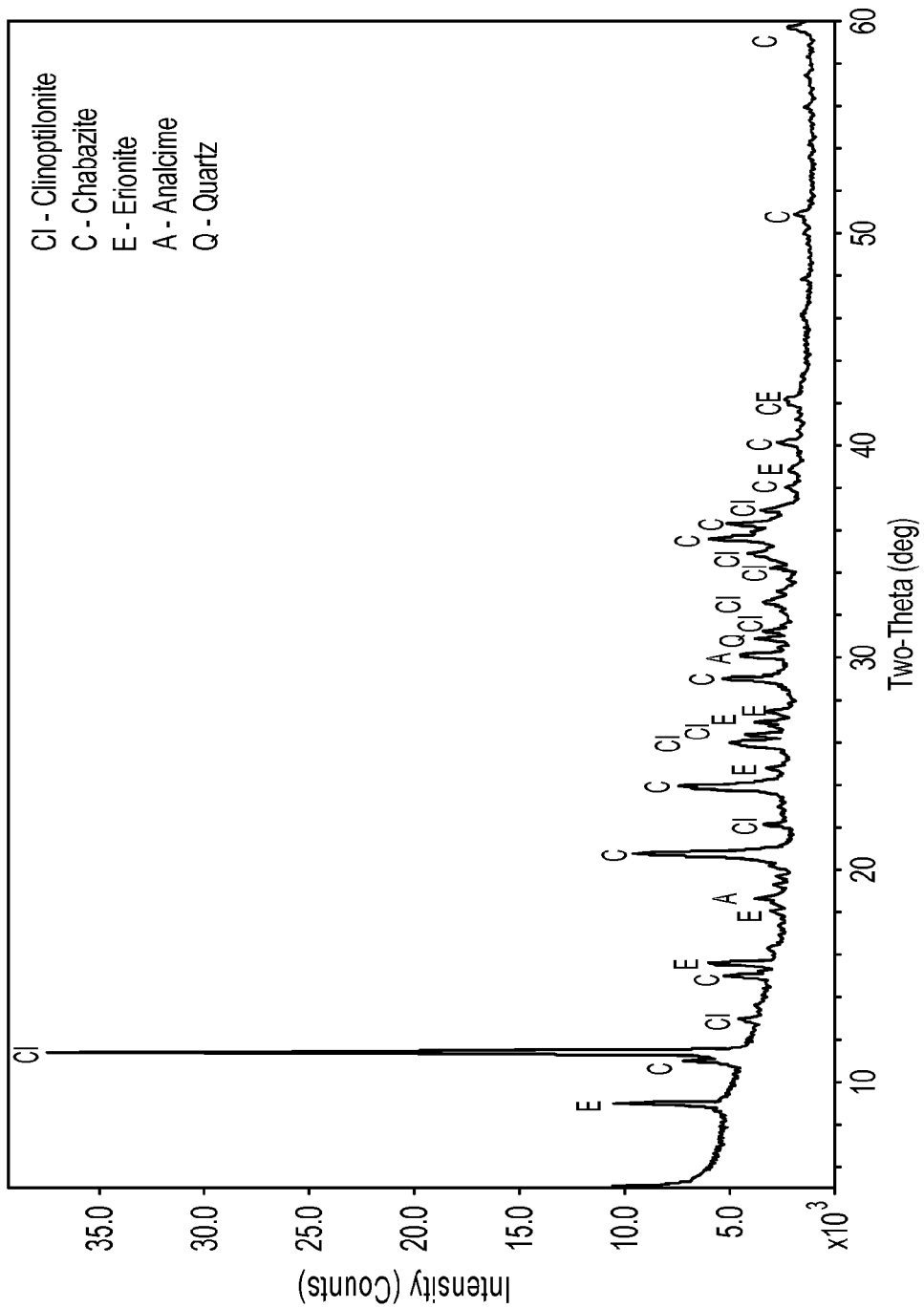
FIG. 1 is an illustration of an X-ray powder diffraction pattern of a natural zeolite sample.

These and other features and advantages of this invention are described in, or are apparent from, the following detailed description of various exemplary aspects.

Aspects of the processes according to this invention aim at the removal of DETA and DETA-metal complexes from the process water or slurry tailings streams of a mineral processing plant by ion-exchange into zeolites. These DETA and DETA-metal complexes are present in the solutions/slurries as residual components from an industrial process (a flotation reagent used during mineral processing). For some other applications, DETA can be added deliberately into a process stream to promote the formation of complexes and improve the heavy metals removal as DETA-metal complexes by ion exchange into zeolite.

Aspects of the processes according to this invention show that a natural zeolite (clinoptilolite) can effectively remove DETA and DETA-metal complexes from process water of a mineral processing plant over a wide range of pH (2~12), which covers the typical conditions encountered in a minerals processing plant as well as a tailings area. The conventional art generally focuses on metal ion removal by zeolites, with little discussion on the removal of organometallic forms of metals and organic chemicals, and with no discussion in the context of mineral processing operations in which DETA is added as part of the process steps.

The existence of competing ions in a system always challenges the efficiency of zeolite. In this application, the effective removal of low levels of DETA and DETA-metal complexes in the presence of high concentrations of Ca and Mg ions and residual amounts of flotation chemicals in the process water is demonstrated. The right type of zeolite is crucial and the highly preferential adsorption of DETA and DETA-metal complexes towards zeolite is unique in this system.

In this way the present invention comprises adding natural zeolite to flotation process water containing DETA and DETA-metal complexes. The natural zeolite is added to the adsorption solution and can be mixed by a mechanical stirrer or by the turbulence generated during pumping or transporting operations to efficiently adsorb DETA and DETA-metal complexes from the process water or slurry tailings streams. Although synthetic zeolite may present advantages over natural zeolite, such as the dimensions of the pore channels that can be tailored to fit the complexes encountered, and for which the composition of the material can be closely controlled, the natural zeolites are preferred for this work because of the low cost.

In order to get the best efficiency, it is necessary to match the crystal structure, chemical composition and pore size of the zeolites with the components to be removed.

A concern was that the metal cations would have to be freed from the organometallic prior to recovery. Instead, it was found that the zeolite has a higher adsorption capacity for the DETA-metal complexes than for some free metal ions. It was demonstrated that the DETA-metal complexes can be more effectively extracted than the free metal ions with zeolite, especially for nickel. This finding offers significant enhancement to systems such as tailing area effluent.

The removal of metal ions from the process streams can be improved by the addition of chelating agents such as DETA. The addition of highly exchangeable DETA into a stream or tailings containing low levels of metal ions would form DETA-metal complexes which are much more easily adsorbed by the zeolite than the free metal ions. DETA additions can be used to enhance the adsorption of metal ions on zeolite which are not preferentially adsorbed as free metal ions.

Another approach to enhance the adsorption of free metal ions would be to use zeolite pre-treated with DETA. This is an ion-exchange based process, in which DETA replaces loosely bonded sodium in the zeolite. The two driving forces, chelation and ion exchange, act to enhance the attraction of the free metal ions to the exchange sites. This pretreatment is different from the prior art, in which chemical reactions are used to functionalize the surface of sorbent materials.

The natural zeolite can be added into several different locations throughout a mineral processing plant. Two locations are preferred for the introduction of natural zeolite: the pyrrhotite tails slurry and the pump sump in the tailings area. From a practical standpoint, the addition of very small amounts of zeolite into pyrrhotite tailings is proposed. The DETA concentration at equilibrium in the pyrrhotite tailings is reduced considerably, and the overall amount of DETA desorbed on dilution of the tailings is also decreased to a large degree.

The adsorption of DETA-metal complexes with zeolite is very robust over a wide pH range (2-12). At very high pH levels, free DETA is not easily adsorbed by zeolite due to the small levels of positive charges carried. By forming complexes with a highly exchangeable metal ion, DETA can be exchanged as complexes even at a very high pH.

Zeolite loaded with DETA or DETA-metal complexes is very stable. This feature allows the zeolite to be recovered from the process stream and treated separately to recover heavy metals so that the zeolite can be regenerated and reused.

All the above focuses on the application of zeolite for the treatment of tailings streams from mineral processing operations, in which DETA and DETA-metal complexes cause difficulties in the removal of heavy metals by the well-known lime precipitation method. In the mineral processing plant, sulfide ore is processed by flotation to produce high grade copper and nickel concentrates for further smelting and refining. The organic chemical DETA is used in flotation to assist with the selective separation of the valuable mineral pentlandite from the waste mineral pyrrhotite. Thus, DETA is present in many of the mill streams, including the slurry tailings stream, and has to be managed in both mill process water and tailings areas.

According to various aspects of the current invention, a process may include contacting the process water or slurry tailings streams of a mineral processing plant with zeolite. The streams contain DETA, DETA-metal complexes, and some residual free heavy metals to be removed, and is saturated with Ca which naturally exists in the process water. This process can be carried out by adding the zeolite granules to the process water or slurry tailings streams while mixing with a mechanical mixer to efficiently adsorb the DETA, the DETA-metal complexes, and heavy metals on the zeolite. Mixing can also occur due to turbulence created while pumping or transporting the streams around the plant. The loaded zeolite is then discarded with the flotation tailings.

According to various aspects of the current invention, the process water or slurry tailings streams of a mineral processing plant containing DETA, DETA-metal complexes and residual heavy metals are contacted with natural zeolite. This can be carried out by adding the natural zeolite to the process streams (slurries) while mixing with a mechanical mixer to efficiently adsorb DETA, DETA-metal complexes and heavy metals from the process streams (slurries) on the zeolite. The loaded zeolite is then discarded with the flotation tailings.

According to various aspects of the current invention, DETA is added to the process water or slurry tailings streams to complex substantially all of the heavy metals to enhance adsorption on the zeolite.

According to various aspects of the current invention, the zeolite is pretreated with DETA in an ion-exchange process to enhance adsorption of the heavy metals on the zeolite.

According to various aspects of the current invention, zeolite is added to the slurry tailings stream and/or the slurry tailings area to control the DETA levels in the slurry tailings area.

Figure 2:
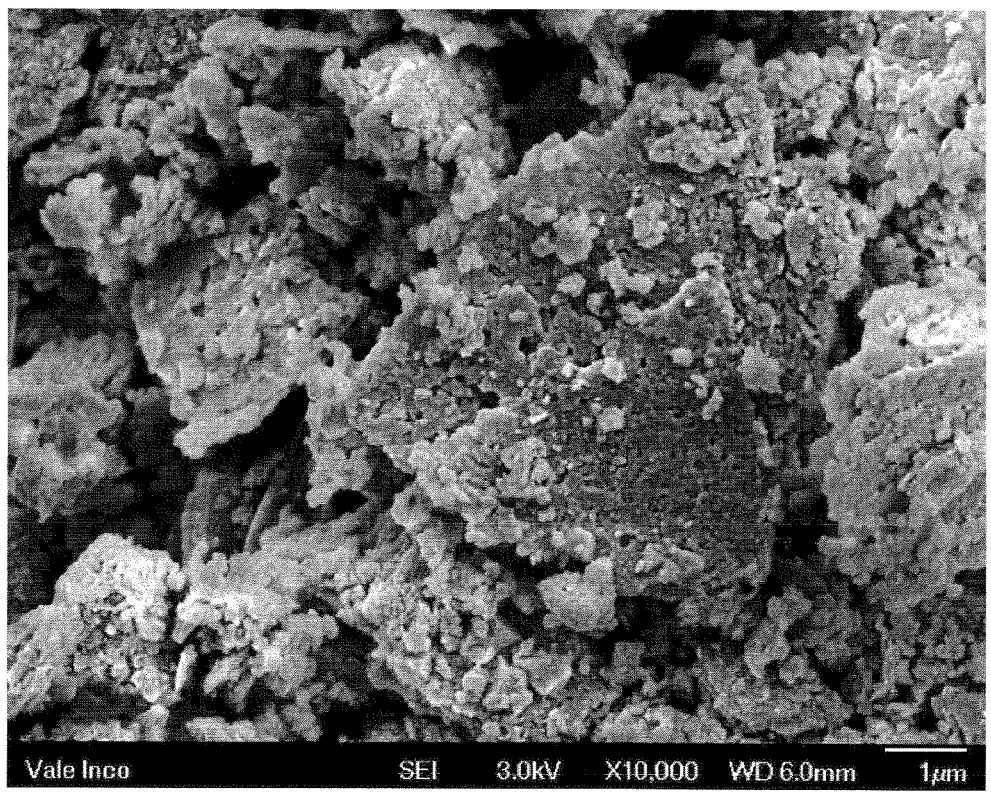
FIG. 2 is a micrographic image of a zeolite.

Natural zeolite granules from the deposit at Bowie, Ariz. were obtained from Zeox Corp. and used as received. The natural zeolite was characterized by X-ray diffraction (XRD) (a Bruker D8 Advance Diffractometer system with a LynexEye detector), and scanning electron microscopy (SEM) (JOEL 7000 HR SEM). The XRD analysis in FIG. 1 showed that the main component was clinoptilolite; with chabazite, erionite and analcime also present (in the order of decreasing abundance) and with trace amounts of quartz. The micrograph of the zeolite in FIG. 2 shows a platy morphology with a sheet-like organization. This natural zeolite has mainly sodium in exchangeable cation sites. This zeolite has pores with a diameter of 4 angstroms, a pore volume of 15%, a specific surface area of 40 m$^2$/g, and an ion exchange capacity of 1.85 milliequivalents/g.

DETA ($H_2N(CH_2)_2NH(CH_2)_2NH_2$) from MP Biomedicals Ltd., and $CuSO_4.5H_2O$ and $NiSO_4.6H_2O$ from J. T. Baker, were used to prepare the adsorption solutions.

According to various aspects of the current invention, tests may be carried out with either synthetic process water and flotation process water in the lab or with actual process streams at the mill site. Synthetic process water was prepared by adding CaSO4.2H2O (from Alfa Aesar), MgCl2.6H2O (from Fisher Scientific), and MgSO4.7H2O (from J. T. Baker) into distilled water to simulate the mill flotation process water. Ca(OH)2 (from J. T. Baker), NaOH (from Fisher Scientific) and H2SO4 (from EMD) were used to adjust the pH to a designated value.

According to various aspects of the current invention, three different types of adsorption solutions may be prepared from the synthetic process water: (S1). ~20 mg/L free DETA, (S2). ~10 mg/L free $Cu^{2+}$ and ~10 mg/L free $Ni^{2+}$ (no DETA), (S3) ~20 mg/L DETA, ~10 mg/L $Cu^{2+}$ and ~10 mg/L $Ni^{2+}$ (DETA-metal complexes and free metal ions co-exist in the system, simulating the composition of flotation process water found in the plant).

According to various aspects of the current invention, flotation process water may be collected from batch flotation tests when DETA was added to reject pyrrhotite. In this case the effectiveness of zeolite for the removal of DETA and DETA-metal complexes was evaluated in the presence of residual frother and/or collector. The pH values of adsorption solutions were adjusted by $Ca(OH)_2$ (to around 9) or NaOH (to 12) and $H_2SO_4$ (to 2). The actual initial concentrations of DETA, $Cu^{2+}$ and $Ni^{2+}$ were determined by ion chromatography (IC) and atomic absorption (AA).

In the adsorption kinetics studies, natural zeolite was added into the adsorption solution and mixed by a mechanical stirrer. Sample solutions were taken at different time intervals for analysis. In the adsorption isotherm studies, different amounts of zeolite were added into specified amounts of the adsorption solutions. The adsorption quantity by zeolite $\Gamma$ (mg/g) was calculated by the following formula:

$$\Gamma = \frac{(C_i - C_e)}{m} \times V_s \quad (1)$$

where $C_i$ (mg/L) is the initial concentration of DETA, $Cu^{2+}$ or $Ni^{2+}$, $C_e$ (mg/L) is the equilibrium concentration, $V_s$ (L) is the volume of adsorption solution, and m (g) is the mass of zeolite added. The data were fitted to a Langmuir adsorption isotherm model $$\Gamma = \Gamma_{max} \times \frac{KC}{1 + KC} \quad (2)$$

to determine the maximum adsorption capacity $\Gamma_{max}$ (mg/g) and the constant of the Langmuir isotherm K (L/mg). The fitting was based on minimizing the sum of squared deviations between the experimental data and the calculated values from the Langmuir isotherm.

In the desorption study, zeolite loaded with DETA, $Cu^{2+}$ and $Ni^{2+}$ (the loading quantities are DETA 0.97 mg/g, $Cu^{2+}$ 0.47 mg/g and $Ni^{2+}$ 0.49 mg/g) was subjected to various levels of dilution by synthetic process water at different pH. The DETA, $Cu^{2+}$ and $Ni^{2+}$ contained in the residual solution of loaded zeolite were subtracted in the calculation of desorption.

The examples below illustrate various aspects of the current invention. Examples 1-3 illustrate the effect of complexation of Ni with DETA on adsorption in zeolites. These examples show that adsorption of the DETA-Ni complex was faster than that for free Ni. The determination of the Langmuir isotherm for free and complexed Ni as presented in Example 4 shows that the maximum adsorption capacity of Ni on zeolite was increased by promotion of the formation of the DETA-Ni complex.

Example 5 demonstrates that low levels of DETA and metal cations can be removed from process water containing residual frother and collector and high levels of Mg and Ca using zeolite.

Examples 2, 6, and 7 illustrate the effect of pH on the adsorption of free or complexed DETA by zeolite. These examples show that DETA (free or complexed) can be removed by zeolite over a wide range of pH from 2 to 12. Forming DETA complexes with Cu at high pH (12) can increase the total DETA adsorbed by zeolite.

Examples 8 and 9 illustrate the effect of pH on the desorption of free and complexed DETA on zeolite. These examples show that the adsorbed DETA (free or complexed) is very stable from pH 2 to 12, as less than 2% DETA desorbed with high dilution (3% solids). Complexed Cu and Ni are very stable at pH above 5. At pH 2, Cu and Ni desorbed from zeolite as free ions, leaving DETA in the structure.

Example 10 illustrates the effect of pretreatment of the zeolite with DETA on the adsorption of free Ni, and shows that free Ni adsorption is significantly improved with the zeolite pretreated with DETA. Some DETA is exchanged into solution at the beginning, but is adsorbed back to zeolite over time.

Examples 11 and 12 illustrate the effectiveness of zeolite for reducing the DETA content from a pyrrhotite (Po) tailings stream. These examples show that zeolite additions into Po tailings can reduce residual DETA in the tailings and decrease the percentage of DETA that desorbs upon dilution.

EXAMPLES

Example 1

Free Cu, Ni and DETA Adsorption by Zeolite

The adsorption tests of free Cu, Ni and DETA by Zeolite were conducted in solutions (S1) free DETA at pH around 9 and (S2) free Cu and Ni at pH 5.5. The concentrations of DETA, $Cu^{2+}$ and $Ni^{2+}$ in solution are presented in FIG. 3 as a function of time. It is evident that zeolite is efficient at adsorbing free DETA (open squares) and free $Cu^{2+}$ (open triangles) from the solutions with high $Ca^{2+}$ (~500 mg/L) and $Mg^{2+}$ (~120 mg/L). The concentrations of DETA and $Cu^{2+}$ decrease to below 1 mg/L in ten minutes and reach almost zero after half an hour. However, the adsorption of free $Ni^{2+}$ (open circles) is slower compared to free DETA and $Cu^{2+}$. The $Ni^{2+}$ concentration is still ~5 mg/L after 30 minutes.

Example 2

DETA-Metal Complexes Adsorption by Zeolite

In the mill process water, DETA is complexed with $Cu^{2+}$/$Ni^{2+}$. Free DETA or free $Cu^{2+}$/$Ni^{2+}$ may exist at pH around 9 depending on the dosage of DETA. The solution (S3) (DETA-metal complexes and free metal cations) was prepared to simulate the actual condition. Initially, there are 18.3 mg/L DETA, 9.4 mg/L $Cu^{2+}$ and 7.4 mg/L $Ni^{2+}$ in the solution (S3). At this concentration, DETA has been completely complexed with metal ions. Essentially all of $Cu^{2+}$ and some of $Ni^{2+}$ are complexed and some free $Ni^{2+}$ exists, based on the calculations from the equilibrium constants of DETA and DETA metal complexes.

Figure 3:
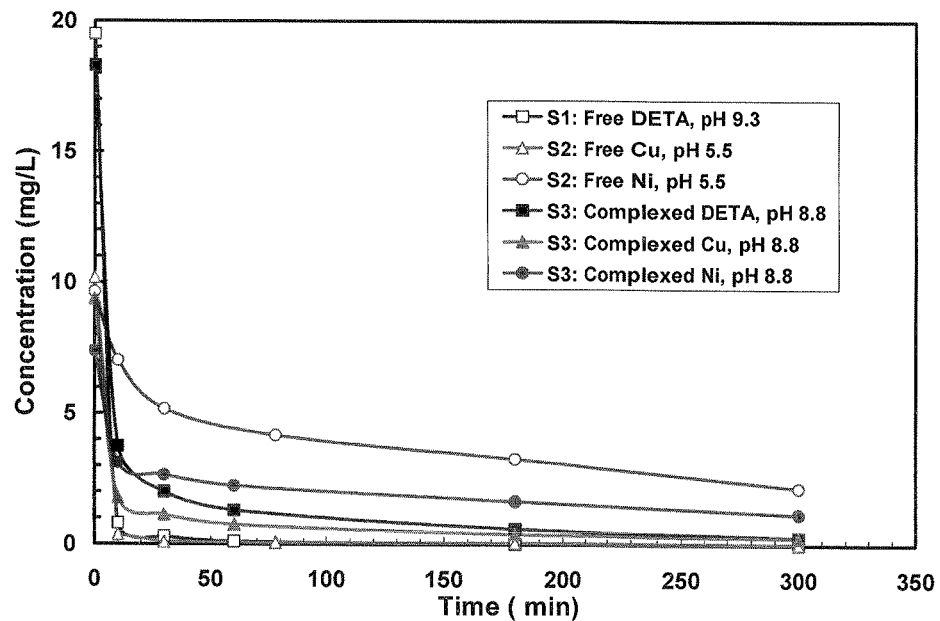
FIG. 3 is an illustration of the adsorption kinetics of free DETA at pH 9.3, free $Cu^{2+}$ and free $Ni^{2+}$ at pH 5.5 and complexed DETA-Cu/Ni on zeolite at pH 8.8 according to various aspects of the current invention.

According to various aspects, the solid symbols illustrated in FIG. 3 shows the concentration changes of individual components from the complexed system. DETA-Cu complexes are effectively removed by zeolite and the rate of removal is slower than for free DETA or free $Cu^{2+}$. The adsorption of Ni from the DETA-Ni complex is faster than free $Ni^{2+}$. It is believed that free $Ni^{2+}$ is not readily exchangeable when there are dominated amounts of competitive ions existing ($Ca^{2+}$ and $Mg^{2+}$ in the process water). After forming DETA-Ni complex, highly exchangeable DETA improves the exchangeability of the complex molecule as a result.

Example 3

Fully Complexed $Ni^{2+}$ Adsorption by Zeolite at pH 8.5

Figure 4:
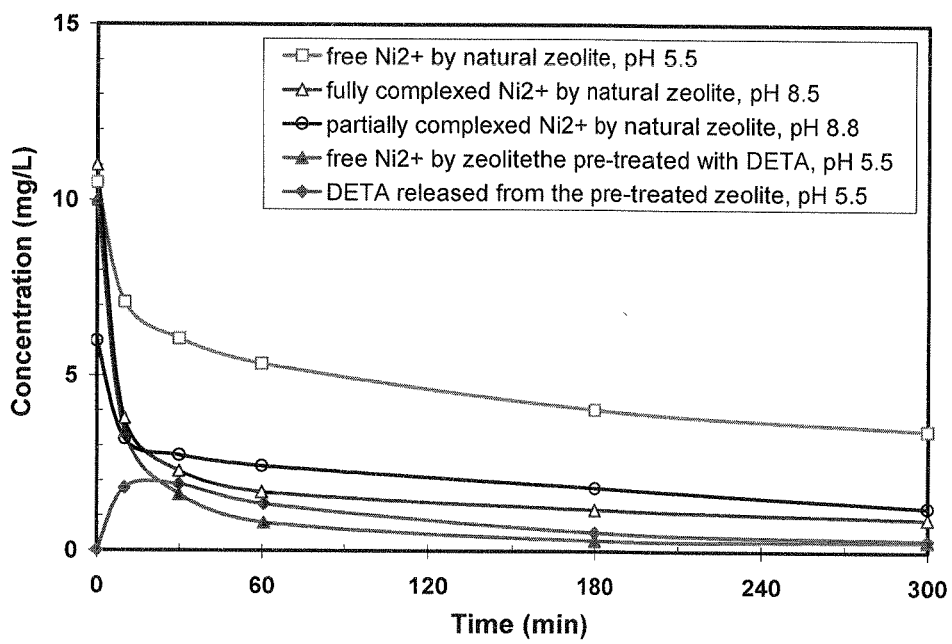
FIG. 4 is an illustration of the adsorption kinetics of free $Ni^{2+}$, fully complexed $Ni^{2+}$ and partially complexed $Ni^{2+}$ by natural zeolite, free $Ni^{2+}$ by DETA pretreated zeolite (1.8 mg DETA/g zeolite), and DETA released from the pretreated zeolite during free $Ni^{2+}$ adsorption according to various aspects of the current invention.

A solution was prepared to have all $Ni^{2+}$ complexed with DETA (the blue triangle line), comparing with the free $Ni^{2+}$ solution (the pink square line) and the $Ni^{2+}$ partially complexed solution (the black round line) in FIG. 4. It shows that after fully complexation with DETA, the overall Ni removal is doubled, leaving much lower Ni ions at equilibrium.

Example 4

Adsorption Isotherm

Figure 5:
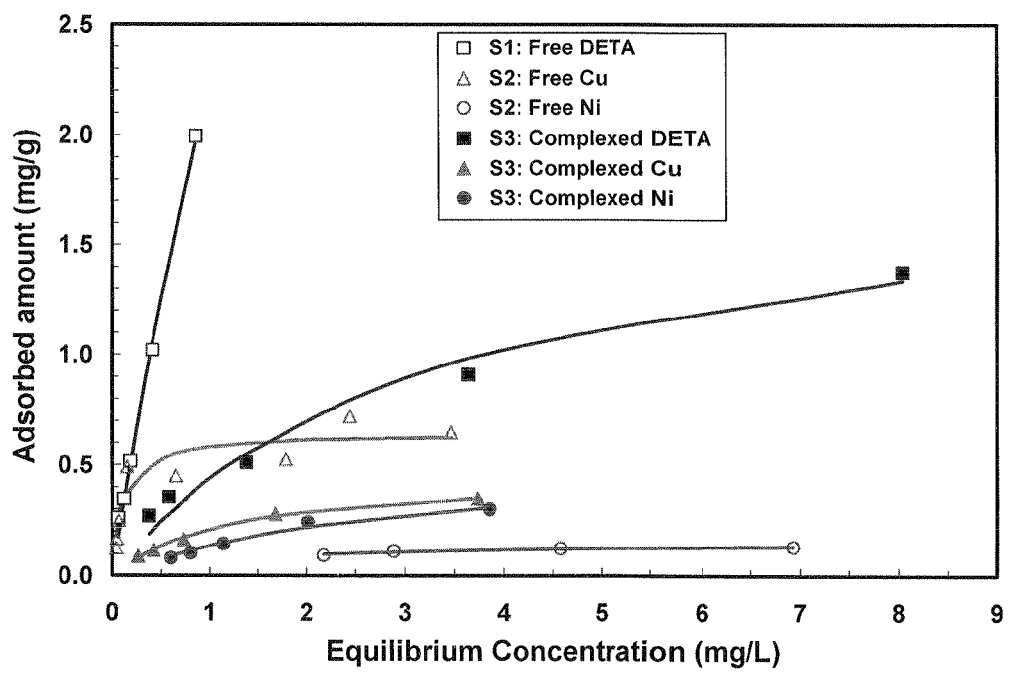
FIG. 5 is an illustration of the Langmuir adsorption isotherm on zeolite fitting the experimental data of DETA, $Cu^{2+}$ and $Ni^{2+}$ from free DETA, $Cu^{2+}$ and $Ni^{2+}$ solutions and DETA-metal complex solution according to various aspects.

The ion-exchange process by natural zeolite was fitted by the Langmuir adsorption isotherm as shown in FIG. 5 (free DETA, $Cu^{2+}$ and $Ni^{2+}$ and DETA-metal complexes). The fitting parameters are summarized in Table 1. The maximum adsorption capacities ($\Gamma_{max}$) of free DETA, $Cu^{2+}$ and $Ni^{2+}$ are 9.35 mg/g, 0.64 mg/g and 0.16 mg/g, respectively. After forming complexes, $\Gamma_{max}$ increased to 0.57 mg/g for $Ni^{2+}$. Therefore, by promoting the formation of the DETA-Ni complex, the nickel adsorption by zeolite was increased.

TABLE 1

The fitting parameters for the Langmuir adsorption isotherm

|  | $\Gamma_{max}$ (mg/g) | K (L/mg) |
| --- | --- | --- |
| Free DETA | 9.35 | 0.31 |
| Free $Cu^{2+}$ | 0.64 | 8.97 |
| Free $Ni^{2+}$ | 0.16 | 0.69 |
| Complexed DETA | 1.91 | 0.29 |
| Complexed $Cu^{2+}$ | 0.47 | 0.79 |
| Complexed $Ni^{2+}$ | 0.57 | 0.30 |

Example 5

Adsorption of DETA from the Process Water of Flotation Tests

Figure 6:
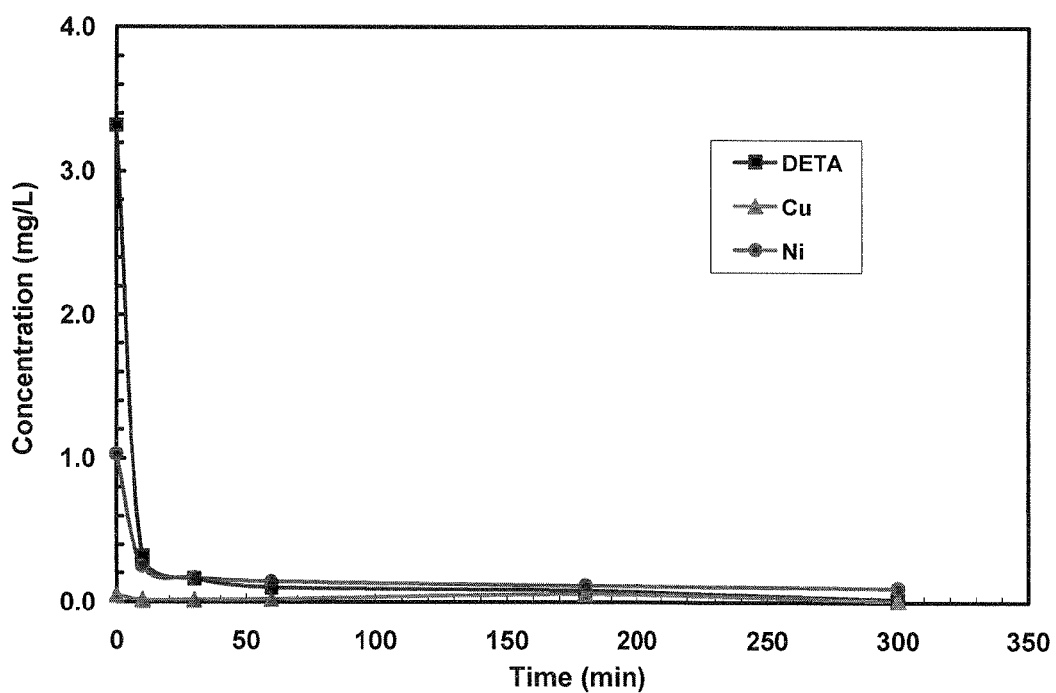
FIG. 6 is an illustration of the adsorption kinetics of DETA, $Cu^{2+}$ and $Ni^{2+}$ on zeolite from the flotation process water test.

The process water collected from batch flotation tests when DETA was added has approximately 3.5 mg/L DETA, 1.0 mg/L $Ni^{2+}$ and negligible $Cu^{2+}$. After adding zeolite for 10 min, the concentrations of DETA and $Ni^{2+}$ are reduced to below 0.3 mg/L (FIG. 6). This demonstrates that zeolite can effectively remove the low levels of DETA and metal cations from the flotation process water in the presence of residual frother and/or collector with high $Ca^{2+}$ and $Mg^{2+}$. Although zeolite may adsorb residual frother and/or collector from the flotation process water by physisorption, it does not occupy the ion exchange sites and these organic compounds do not interfere with the removal of DETA and DETA-metal complexes by zeolite.

Example 6

Adsorption of Free DETA at Low pH 2 and High pH 12

Figure 7:
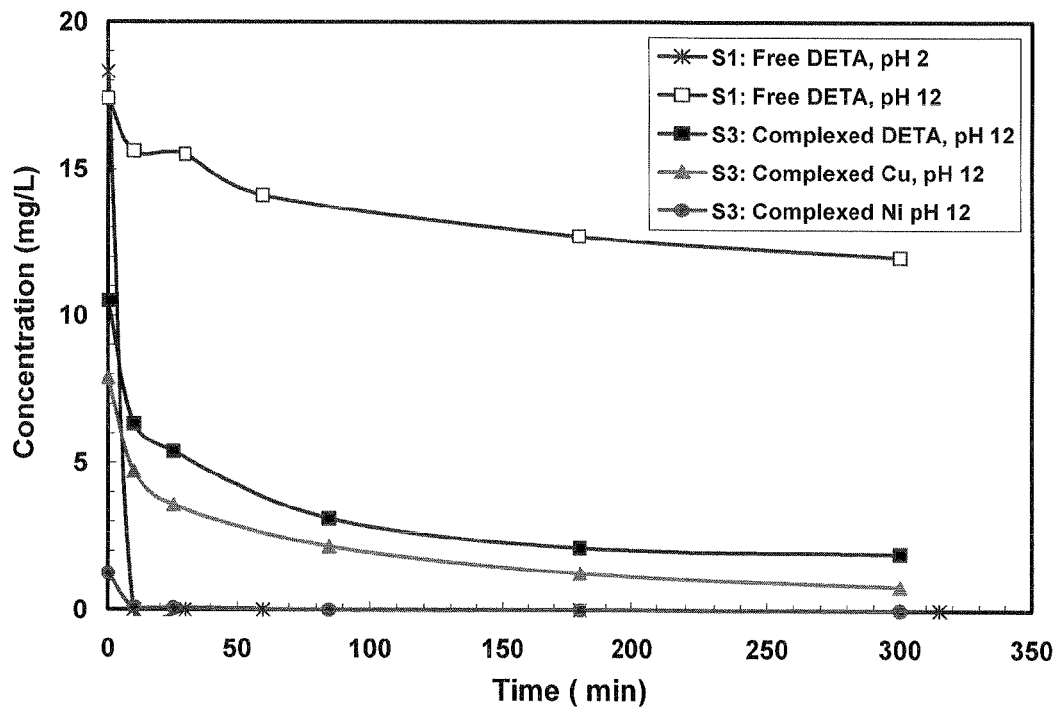
FIG. 7 is an illustration of the adsorption kinetics of free DETA at pH 2 and 12, and DETA-metal complexes at pH 12 on zeolite according to various aspects.

In the tailings ponds, extreme conditions may also occur, such as low pH (acid-generating Po tails) or high pH (localized lime addition). The adsorption of free DETA at pH 2 and 12 is shown in FIG. 7. At low pH 2, the free DETA is immediately adsorbed by zeolite. However, at pH 12, the adsorption is much slower, only about 30%. This is because the adsorption of DETA is strongly related to its acidification reaction. In solutions, depending on the pH, DETA can carry +1, +2 or +3 charges. The protonated DETA can be easily exchanged into zeolite. According to the theoretical calculation based on equilibrium constants, at pH 2, 99.5% of DETA is protonated as $DETA.H^{3+}$ and the other 0.5% as $DETA.H^{2+}$. So they can be completely adsorbed by zeolite. However, at pH 12, 99% of DETA is not protonated, and 1% as $DETA.H^+$. That is why the exchange adsorption is very slow at pH 12 by gradually protonation and adsorption. In previous example 1, at pH 9.3, majority of DETA (89%) has been protonated (51% $DETA.H^+$, 38% $DETA.H^{2+}$ and 11% DETA). During adsorption, protonation continues for the remaining 11% DETA making DETA eventually adsorbed by zeolite.

Example 7

Adsorption of DETA-Metal Complexes at High pH 12

However, at pH 12 the adsorption behaviour of DETA-metal complexes is different from free DETA at pH 12 (as shown in FIG. 7). After raising the pH and filtering to remove any precipitates at high pH, the remaining soluble complexes are 10.5 mg/L DETA, 7.9 mg/L $Cu^{2+}$ and 1.3 mg/L $Ni^{2+}$. After zeolite is added, $Ni^{2+}$ is reduced to zero rapidly; $Cu^{2+}$ and DETA are reduced to around 2 mg/L (80% removal) after 3 hrs, which is better than the free DETA at pH 12 (only 30% free DETA removal). The calculation under these initial conditions (ions concentration and pH) shows that 99.7% DETA complexed with Cu ions as $Cu(OH)(DETA)^+$. The positive charge of the complex enables it to better exchange into zeolite at pH 12 than free DETA.

Example 8

Desorption at Normal pH Levels

Figure 8:
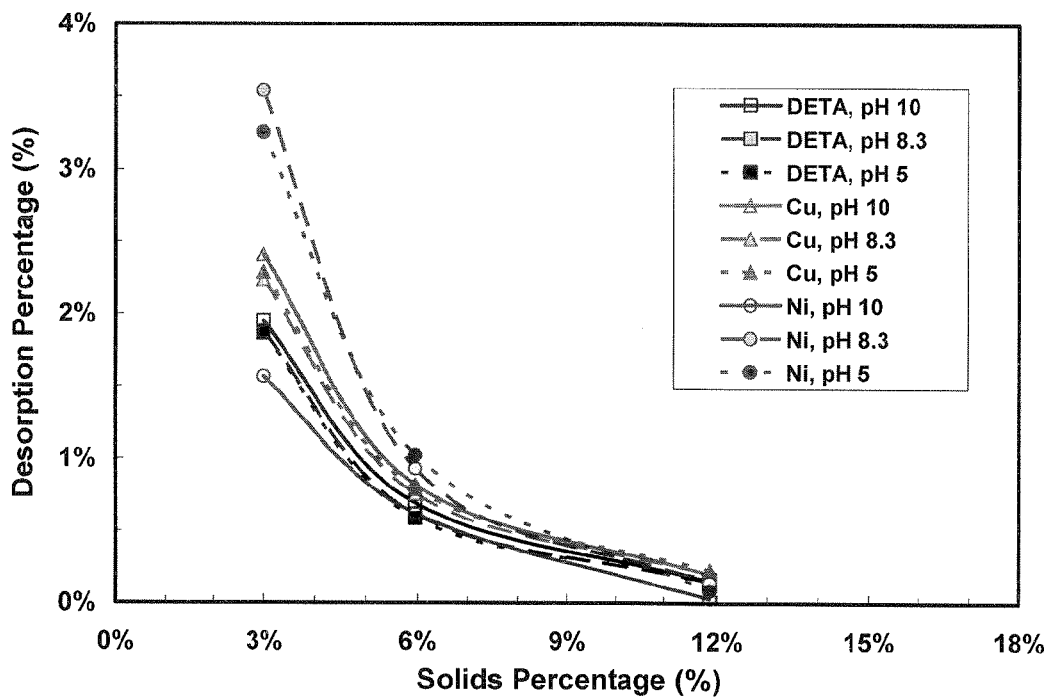
FIG. 8 is an illustration of DETA, $Cu^{2+}$, and $Ni^{2+}$ desorption from loaded zeolite at pH 10, 8.3 and 5 according to various aspects.

The long-term stability of loaded zeolites is critical when they are disposed in tailings ponds. Desorption tests are conducted at pH 10, 8.3 and 5 which are in the typical pH range of the tailings ponds. The percentages of DETA, $Cu^{2+}$ and $Ni^{2+}$ desorbed from the zeolite are presented in FIG. 8. The percentage of desorption increases with the decrease of solids percentage. However, the highest desorption of DETA, $Cu^{2+}$ and $Ni^{2+}$ is less than 4% at about 3% solids percentage (very high dilution). No significant difference in desorption is observed for the three pH values, except that $Ni^{2+}$ desorbs less at pH 10 than those at pH 8.3 and 5. After the systems are left statically in the ambient conditions for 16 days, it is found that instead of more desorption, the concentrations of DETA, $Cu^{2+}$ and $Ni^{2+}$ in the solution is further reduced. These results clearly demonstrate the high stability and high loading capacity of zeolite.

Example 9

Desorption at Extreme pH Levels

Figure 9:
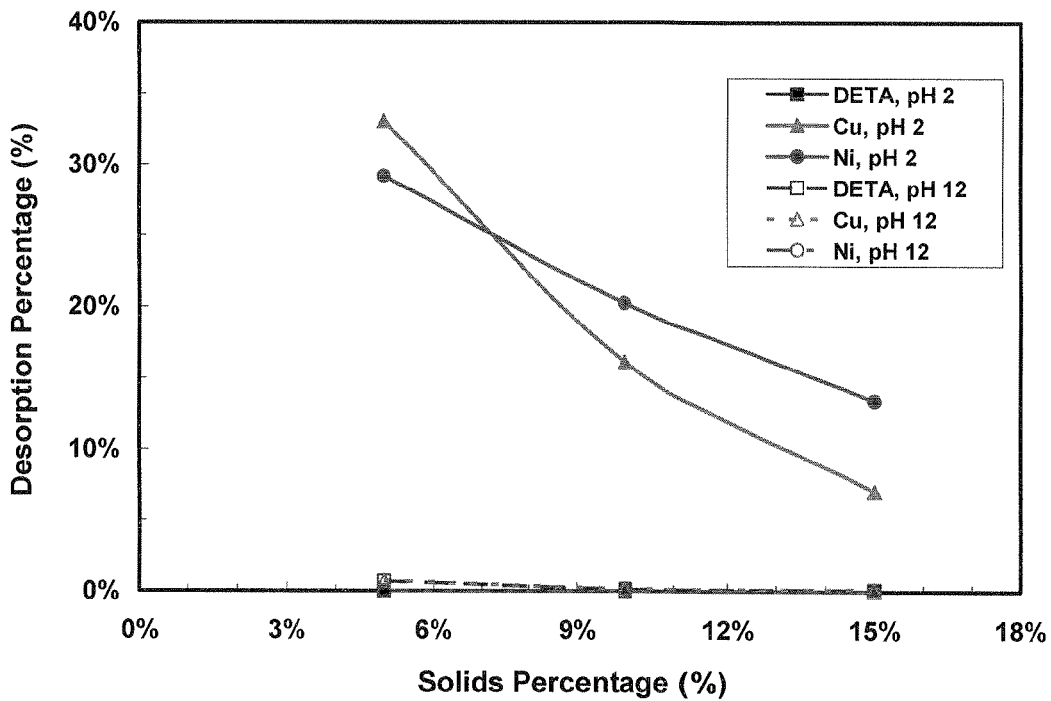
FIG. 9 is an illustration of DETA, $Cu^{2+}$, and $Ni^{2+}$ desorption from loaded zeolite at pH 2 and 12 according to various aspects.

Desorption tests at pH 2 (FIG. 9) shows that more $Cu^{2+}$ and $Ni^{2+}$ are desorbed from zeolite than those at pH 10, 8.3 and 5, but there is no DETA desorption. The desorption of $Cu^{2+}$ and $Ni^{2+}$ is due to the competitive exchange from protons ($H^+$). However, the desorbed free $Cu^{2+}$ and $Ni^{2+}$ can be easily precipitated by raising pH as the conventional precipitation method used in the waste water treatment plant. At pH 12, the highest desorption of DETA and $Cu^{2+}$ was less than 1% and there was no $Ni^{2+}$ detected in the solution.

Example 10

Free $Ni^{2+}$ Adsorption by Zeolite Pretreated with DETA at pH 8.5

Zeolite was pretreated with DETA to obtain 1.8 mg DETA per gram of zeolite exchanged into the structure. This pretreated zeolite was used for free Ni ion adsorption (Solid green triangle in FIG. 4). In this case, much more $Ni^{2+}$ is adsorbed than using zeolite without DETA pretreatment. The result is even better than fully complexed DETA-Ni adsorbed by natural zeolite (the blue open triangle line in FIG. 4). It is also observed that some DETA is exchanged into solution at the beginning (<2 ppm). However, some DETA is exchanged back into zeolite (<0.2 ppm) with time without losing Ni adsorption capacity (Red diamonds in FIG. 4).

Example 11

DETA Adsorption from Pyrrhotite (Po) Tailings Slurry with/without Zeolite

One application of zeolite is to add zeolite into the pyrrhotite (Po) tailing stream at Clarabelle Mill to adsorb DETA. Currently, Po tailings are the major stream carrying DETA. Previous studies showed that Po has some DETA adsorption capacity. However, the adsorbed DETA on Po can be released back to the aqueous phase if the Po tailings experience high dilution during disposal. This example compares the differences in DETA adsorption/desorption from Po tailings with/without zeolite.

Figure 10:
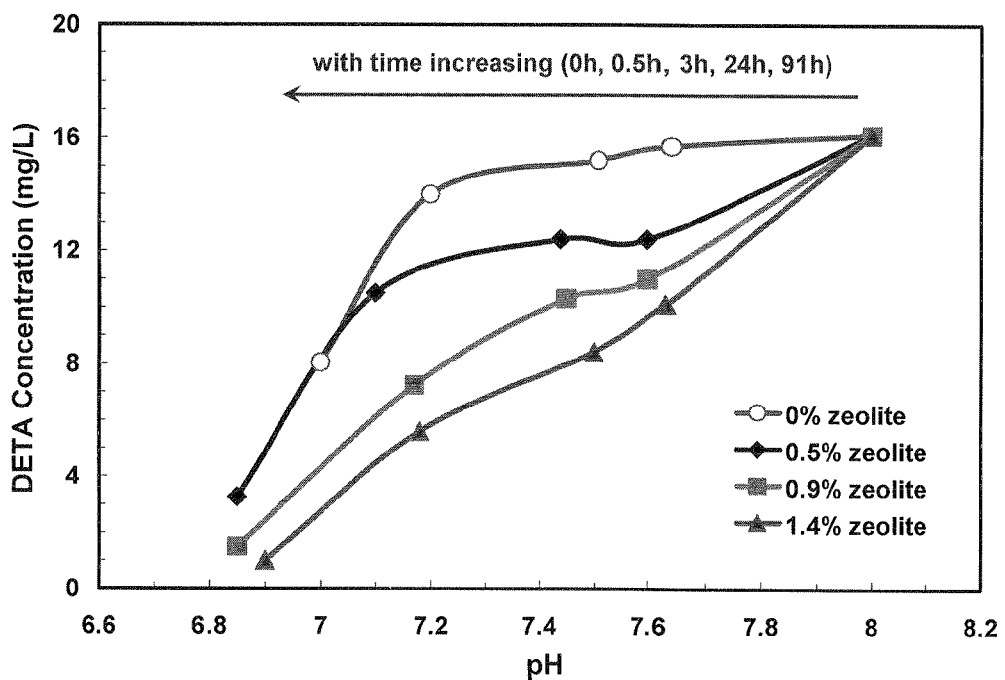
FIG. 10 is an illustration of the changes in DETA concentration and pH values in a pyrrhotite tailings slurry mixed with different percentages of zeolite as a function of time according to various aspects.

Initially, about 150 g/t of DETA is adsorbed on Po tailings after one hour of mixing, with 16 mg/L equilibrium DETA concentration in the Po tailings water. Different percentages (0%, 0.5%, 0.9% and 1.4%) of zeolite to the dry weight of Po tailings are added into the slurry of Po tailings. The total solids percentage is maintained at 30%. The change in DETA concentration in Po tailings water with time and pH is shown in FIG. 10.

The pH of Po tailings without zeolite (red circles) gradually decreases from initial 8.5 to 7.0 after 91 hours of mixing due to pyrrhotite oxidation. The DETA concentration in tailings water also decreases from 16 mg/L to 8 mg/L, indicating more DETA adsorbed by Po tailings at lower pH. Earlier research work showed that acidic pH enhances DETA adsorption onto Po tailings. DETA carries positive charges through an acidification reaction as pH decreases. For example, at pH 9.5, 11% of total DETA is neutral, while 52% is $DETA.H^+$ and 38% $DETA.H^{2+}$. At pH 5, about 83% of total DETA is $DETA.H^{2+}$ and 17% $DETA.H^{3+}$ without any neutral DETA. It also shows that in simulated process water, the surface of Po is negatively charged over pH from 4 to 12. Therefore, lower pH is favorable for DETA adsorption on Po tailings.

With a small amount of zeolite added into Po tailings (0.5, 0.9 and 1.4%), DETA concentration decreases much faster than the case without zeolite. With >0.9% zeolite mixed with Po tailings slurry, DETA concentration is reduced to 1.5 mg/L. The calculated DETA adsorbed by zeolite is about 830 g/t, after subtracting the DETA adsorbed by Po tailings.

Example 12

DETA Desorption from Pyrrhotite (Po) Tailings Slurry with/without Zeolite

Figure 11:
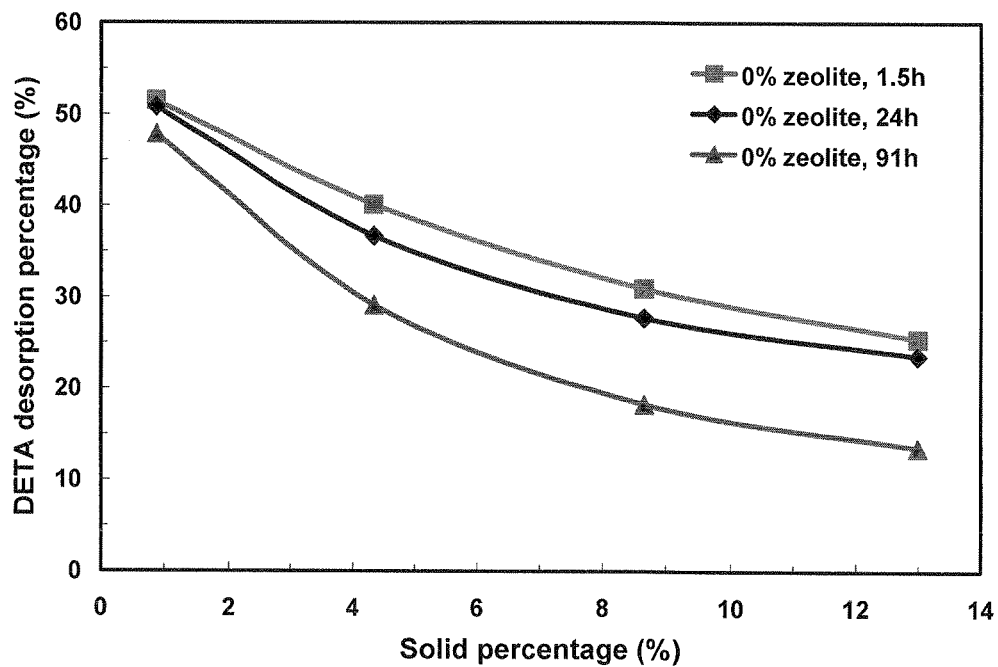
FIG. 11 is an illustration of the DETA desorption from a pyrrhotite tailings slurry containing no zeolite as a function of the dilution of the slurry according to various aspects.

When pyrrhotite (Po) tailings (with/without zeolite) loaded with DETA are diluted to lower solids percentages with simulated process water at pH 8.5, DETA desorption is expected. As shown in FIG. 11, with increasing dilution (i.e. decreasing solids percentage), the DETA desorption percentage increases as expected. Without zeolite, DETA desorption slightly decreases from 1.5 h to 91 h. This is due to the decrease in pH by the acid generated from Po tailings and consequently enhanced DETA adsorption on Po tailings.

Figure 12:
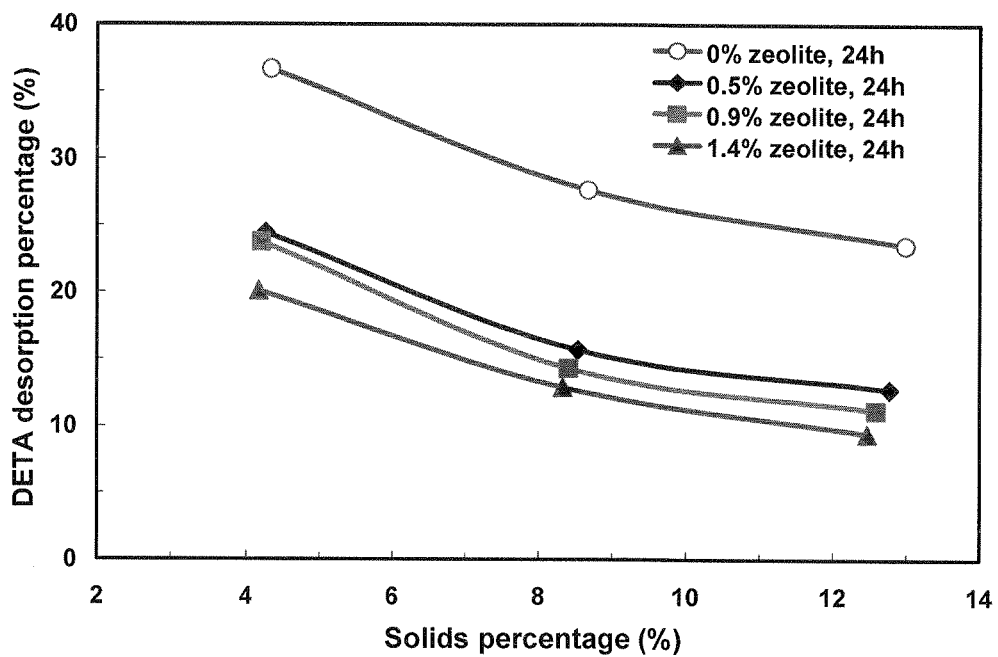
FIG. 12 is an illustration of the DETA desorption from a pyrrhotite tailings slurry containing added zeolite as a function of the dilution of the slurry after 24 h shaking according to various aspects.

With some zeolite added into Po tailings, the overall DETA desorption after 24 hours at the same solids percentage is much lower (FIG. 12). The decrease in DETA desorption is attributed to zeolite. Some of the DETA desorbed from Po tailings is re-adsorbed by zeolite. The more zeolite initially contained in the tailing, the less overall DETA desorption.

While this invention has been described in conjunction with the exemplary aspects outlined above, various alternatives, modifications, variations, improvements, and/or substantial equivalents, whether known or that are or may be presently unforeseen, may become apparent to those having at least ordinary skill in the art. Accordingly, the exemplary aspects of the invention, as set forth above, are intended to be illustrative, not limiting. Various changes may be made without departing from the spirit and scope of the invention. Therefore, the invention is intended to embrace all known or later-developed alternatives, modifications, variations, improvements, and/or substantial equivalents.

What is claimed is:

1. A method of removing organic chemicals and organometallic complexes from the process water or slurry tailings streams of a mineral processing plant, the process water or slurry tailings streams containing DETA and DETA-heavy metal complexes, the method comprising the steps of:
   mixing the process water or slurry tailings streams containing the DETA and DETA-heavy metal complexes with a zeolite to adsorb the DETA, DETA-heavy metal complexes and any residual free heavy metal ions; and
   discarding the zeolite with the slurry tailings from the mineral processing plant.

2. The method of claim 1, wherein mixing the zeolite with the process water or slurry tailings streams comprises adding zeolite granules to the process water or slurry tailings streams.

3. The method of claim 2, wherein the zeolite is mixed by mechanical stirring.

4. The method of claim 2 wherein the zeolite is mixed via the turbulence generated in the transportation of the process water or slurry tailings streams.

5. The method of claim 2, wherein mixing is carried out in situ at the mineral processing plant.

6. The method of claim 1, wherein the zeolite is a natural zeolite selected from the group consisting of clinoptilolite, chabazite, mordenite, erionite, and phillipsite.

7. The method of claim 1, wherein the organometallic complexes comprise substantially Cu and Ni.

8. The method of claim 1, wherein the organometallic complexes comprise at least one of Cd, Co, Cr, Zn, Pb, Hg, Ag, Cs, Rb, Ba or Sr.

9. The method of claim 1, wherein the pH of the process water or slurry tailings streams range from about 2 to 12.

10. The method of claim 1, comprising, prior to mixing the process water or slurry tailings streams with the zeolite, a step of pretreating the zeolite with DETA in an ion-exchange process to enhance adsorption of the heavy metals on the zeolite.

11. The method of claim 1, comprising, prior to mixing the process water or slurry tailings streams with zeolites, a step of adding DETA to the process water or slurry tailings streams to complex substantially all of the heavy metals.

12. The method of claim 1, wherein the organic chemicals comprise organic chemicals from an amine group and polyamines that carry positive charges after dissociation in the solution at different pH values and are highly exchangeable into zeolite.

13. The method of claim 12, wherein the organic chemicals comprise triethylenetetramine.

14. A method of removing organic chemicals and organo-metallic complexes from the process water or slurry tailings streams of a mineral processing plant, the process water or slurry tailings streams containing DETA and DETA-heavy metal complexes, the method comprising the steps of:
   pretreating zeolite with DETA in an ion-exchange process to enhance adsorption of the heavy metals on a zeolite;
   contacting the process water or slurry tailings streams containing the DETA and DETA-heavy metal complexes with the zeolite to adsorb the DETA, DETA-heavy metal complexes and any residual free heavy metal ions; and
   discarding the zeolite with the tailings from the mineral processing plant.

15. A method of removing organic chemicals and organo-metallic complexes from the process water or slurry tailings streams of a mineral processing plant, the process water or slurry tailings streams containing DETA and DETA-heavy metal complexes, the method comprising the steps of:
   adding DETA to the process water or slurry tailings streams to complex substantially all of the heavy metals;
   contacting the process water or slurry tailings streams containing the DETA and DETA-heavy metal complexes with a zeolite to adsorb the DETA, DETA-heavy metal complexes and any residual free heavy metal ions; and
   discarding the zeolite with the tailings from the mineral processing plant.

16. A method of controlling DETA levels in slurry tailings area of a minerals processing plant comprising:
   adding up to about 5% zeolite to a slurry tailings stream to manage a continued release of DETA through the slurry tailings stream; and
   adding up to about 5% zeolite to the slurry tailings area to manage a continued desorption of DETA from solid tailings.

* * * * *